US012752603B2

(12) United States Patent
Kim et al.

(10) Patent No.: US 12,752,603 B2
(45) Date of Patent: Oct. 6, 2026

(54) AIR EXTRACTOR GRILLE DUCT

(71) Applicants: HYUNDAI MOTOR COMPANY, Seoul (KR); KIA CORPORATION, Seoul (KR)

(72) Inventors: Jin Han Kim, Ansan-si (KR); Seung Won An, Seoul (KR); Hae Ryong Park, Incheon (KR); Gyeong Won Jeong, Naju-si (KR); Sun Dong Kim, Hwaseong-si (KR); Jae Won Heo, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 405 days.

(21) Appl. No.: 18/532,717

(22) Filed: Dec. 7, 2023

(65) Prior Publication Data

US 2025/0074152 A1 Mar. 6, 2025

(30) Foreign Application Priority Data

Aug. 31, 2023 (KR) ........................ 10-2023-0115028

(51) Int. Cl.
*B60H 1/24* (2006.01)
*B60H 1/00* (2006.01)

(52) U.S. Cl.
CPC ....... *B60H 1/248* (2013.01); *B60H 2001/006* (2013.01)

(58) Field of Classification Search
CPC ... B60H 1/248; B60H 1/249; B60H 2001/006
See application file for complete search history.

(56) References Cited

U.S. PATENT DOCUMENTS

| | | | | |
|---|---|---|---|---|
| 2,849,941 A * | 9/1958 | Kaiji | ...................... | B60H 1/249 454/120 |
| 7,137,880 B2 * | 11/2006 | Omiya | .................. | B60H 1/249 454/162 |
| 9,849,754 B2 * | 12/2017 | Kim | ...................... | B60H 1/249 |

FOREIGN PATENT DOCUMENTS

| | | |
|---|---|---|
| KR | 20100023396 A | 3/2010 |

* cited by examiner

*Primary Examiner* — Allen R. B. Schult
(74) *Attorney, Agent, or Firm* — Lempia Summerfield Katz LLC

(57) ABSTRACT

An air extractor grille duct includes: an air extractor grille configured to be selectively opened due to a pressure difference between the interior and exterior of a vehicle so that interior air is discharged; a duct housing connected to the air extractor grille and configured to provide a discharge path for the interior air; and a sound-absorbing cover connected to the duct housing, provided with an inclined surface, and configured to guide discharged interior air to flow along the inclined surface toward the discharge path.

7 Claims, 4 Drawing Sheets

AIR EXTRACTOR GRILLE DUCT

CROSS REFERENCE TO RELATED APPLICATION

The present application claims priority to Korean Patent Application No. 10-2023-0115028, filed Aug. 31, 2023, the entire contents of which are incorporated herein for all purposes by this reference.

BACKGROUND

Technical Field

The present disclosure relates to an air extractor grille duct. More specifically, the present disclosure relates to an air extractor grille duct that may effectively secure trunk space and differentiate exterior design and, at the same time, improve ventilation flow paths, and effectively block noise from entering the passenger compartment or cabin.

Description of the Related Art

In general, a DEFOG function needs to be implemented to secure a front view of a vehicle. Additionally, the function of opening and closing a door when getting in and out of a vehicle is also of significant importance.

To this end, it is essential to secure a vehicle's ventilation performance. Therefore, most vehicles are currently equipped with an air extractor grille for ventilation.

Functions of a device such as the air extractor grille for securing the vehicle's ventilation performance are classified into: ① ensuring ventilation performance-rapid discharging of internal air when the internal air pressure rises; ② watertight function-preventing inflow of water from the outside in rainy or wet weather; and ③ preventing inflow of external foreign substances-blocking the inflow of external air/foreign substances. An operating principle of the device is to make the device serve as a valve through a flap having directionality.

Such an air extractor grille is typically installed at the rear of a rear wheelhouse panel between a rear bumper of the vehicle and the trunk.

Recently, in order to differentiate the exterior design of a vehicle, there is a tendency to equip a rear combination lamp by lowering it in a downward direction or to expand the size of the rear combination lamp. A parting portion of the rear bumper may also be lowered accordingly.

Therefore, an air extractor grille installation position also has no choice but to move downward. When the air extractor grille is moved downward and installed, there arises a problem in that, not only will the trunk space be reduced, but the size of the car body will be increased to provide for more installation space.

The foregoing is intended merely to aid in the understanding of the background of the present disclosure. The foregoing is not intended to mean that the present disclosure falls within the purview of the related art that is already known to those having ordinary skill in the art.

SUMMARY

Accordingly, the present disclosure has been made keeping in mind the above problems occurring in the related art. Additionally, the present disclosure is intended to provide an air extractor grille duct that may improve ventilation performance by installing an air extractor grille. The air extractor grille and duct allow a vehicle's interior air to be discharged by allowing a valve or damper to open due to the pressure difference between the interior and exterior of the vehicle. The air extractor grille is positioned at the bottom of the side outer panel along with the duct and exposed to the exterior. Furthermore, the air extractor grille and duct, at the same time, may facilitate the exhaustion of interior air and may reduce the inflow of noise into the cabin through the air extractor grille by providing an air flow hole in the duct by mounting a sound-absorbing cover having an inclined surface to the duct.

In order to achieve the above objectives, according to the present disclosure, an air extractor grille duct is provided. The duct includes an air extractor grille configured to be selectively opened due to a pressure difference between the interior and exterior of a vehicle so that interior air of the vehicle is discharged. The duct also includes a duct housing connected to the air extractor grille and configured to provide a discharge path for the interior air. Additionally, the duct includes a sound-absorbing cover connected to the duct housing, provided with an inclined surface, and configured to guide discharged interior air to flow along the inclined surface toward the discharge path.

The air extractor grille may be provided with a valve or damper, such as a plurality of flap members arranged continuously in a vertical direction and configured to allow the flap members to be maintained in a blocked or blocking state by their own weight and to be opened as a pressure difference occurs.

In addition, the duct housing may be mounted on a lower part of a side outer panel and may be provided to be exposed to the outside together with the air extractor grille.

The duct housing may be provided with a mounting area with a shape that corresponds to a shape of the side outer panel and may be positioned in contact with the side outer panel through the mounting area.

Further, in a state where the mounting area may be positioned in contact with the side outer panel, the duct housing may be provided with a fastening member that penetrates through and fastens to both the mounting area and the side outer panel.

The sound-absorbing cover may include a main body mounted on an upper part of a side outer panel to face the duct housing and including the inclined surface provided to slope downward with respect to a center part. The sound-absorbing cover may also include mounting members extending from a lower part of the main body and allowing an air flow area to be provided therein.

The main body may be mounted upright above the upper part of the side outer panel by the mounting members and in a direction opposite to a direction in which the interior air is discharged.

In addition, the main body may be provided with a sound-absorbing pad coupled to an inside of the inclined surface. The sound-absorbing pad is configured to block a noise introduced through an opening of the air extractor grille from entering a cabin of the vehicle.

As described above, the present disclosure has an effect of improving ventilation performance compared to the related art by installing an air extractor grille. The air extractor grille allows the vehicle's interior air to be discharged by allowing the valve or damper to open due to the pressure difference between the interior and exterior. The air extractor grille may be located at the bottom of the side outer panel along with the duct and exposed to the exterior.

In addition, the present disclosure has an effect of facilitating the exhaustion of interior air and reducing the inflow of noise into the cabin through the air extractor grille by allowing an air flow hole to be provided in the duct by mounting a sound-absorbing cover including an inclined surface to the duct.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION

Hereinbelow, exemplary embodiments of the present disclosure are described in detail with reference to the accompanying drawings.

Advantages and features of the present disclosure and a method of achieving same should become clearer with reference to the embodiments described below in detail in conjunction with the accompanying drawings.

However, the present disclosure is not limited by the embodiments disclosed below but may be implemented in a variety of different forms. The embodiments are only provided to make the present disclosure complete and to fully inform those having ordinary skill in the art of the scope of the disclosure to which the present disclosure pertains. Furthermore, the present disclosure is only defined by the scope of the claims.

In addition, in the description of the present disclosure, when it is determined that related known technologies may obfuscate the gist of the present disclosure, a detailed description thereof has been omitted.

When a component, device, element, or the like of the present disclosure is described as having a purpose or performing an operation, function, or the like, the component, device, or element should be considered herein as being "configured to" meet that purpose or perform that operation or function.

Figure 1:
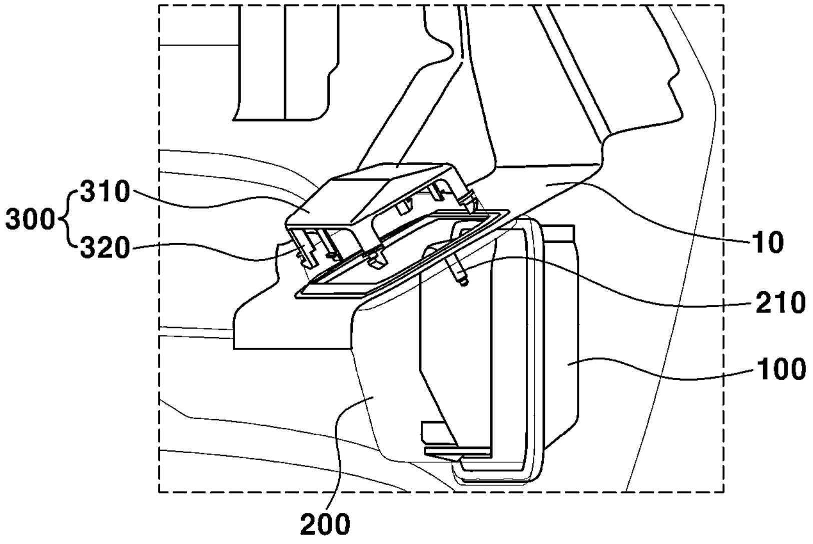
FIG. 1 is a view schematically showing an air extractor grille duct according to an embodiment of the present disclosure.
Figure 2:
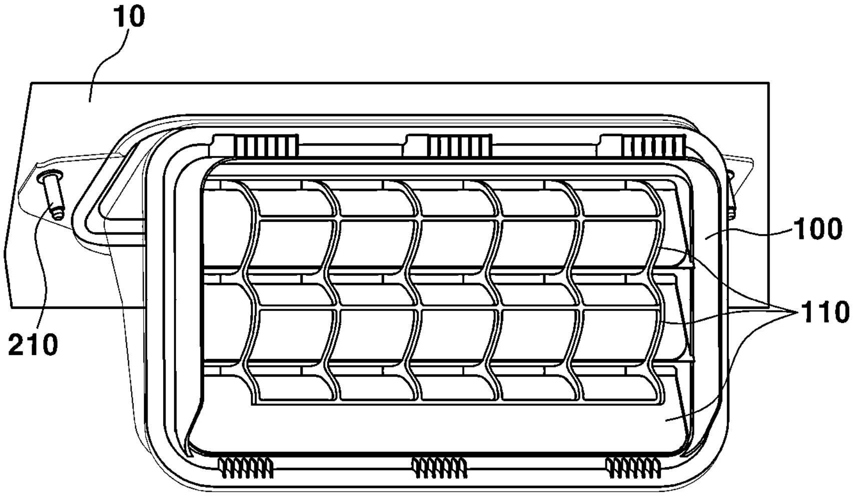
FIG. 2 is a view showing an air extractor grille for the air extractor grille duct according to an embodiment of the present disclosure.
Figure 3:
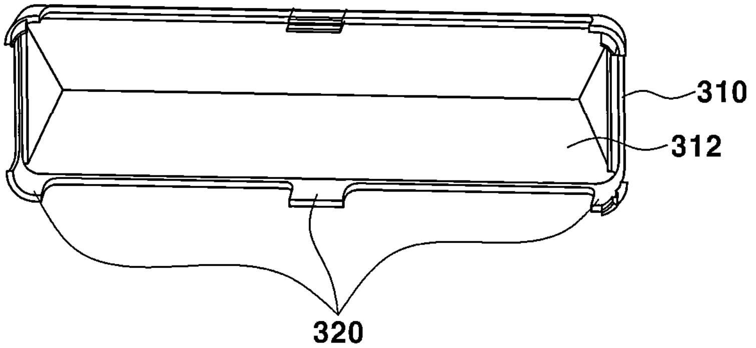
FIG. 3 is a view showing a sound-absorbing cover for the air extractor grille duct according to an embodiment of the present disclosure.

FIG. 1 is a view schematically showing an air extractor grille duct according to an embodiment of the present disclosure. FIG. 2 is a view showing an air extractor grille for an air extractor grille duct according to an embodiment of the present disclosure. FIG. 3 is a view showing a sound-absorbing cover for an air extractor grille duct according to an embodiment of the present disclosure.

Figure 4:
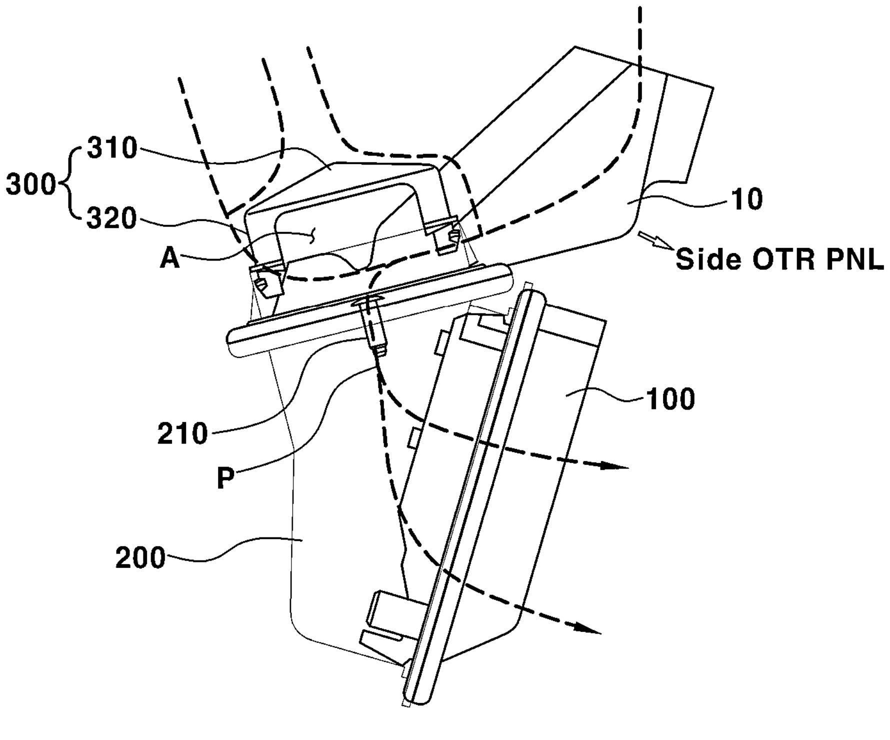
FIG. 4 is a view showing a discharge path in an air extractor grille duct according to an embodiment of the present disclosure.
Figure 5:
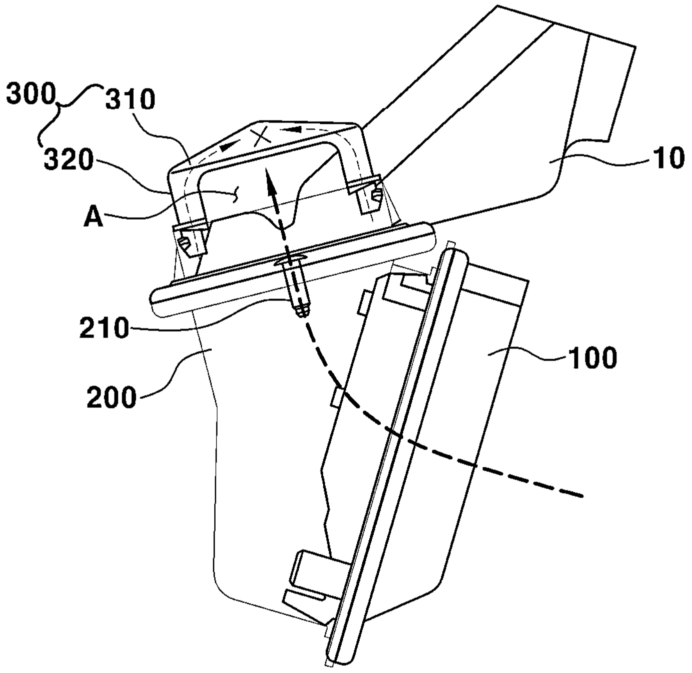
FIG. 5 is a view showing noise inflow blocking by an air extractor grille duct according to an embodiment of the present disclosure.
Figure 6A:
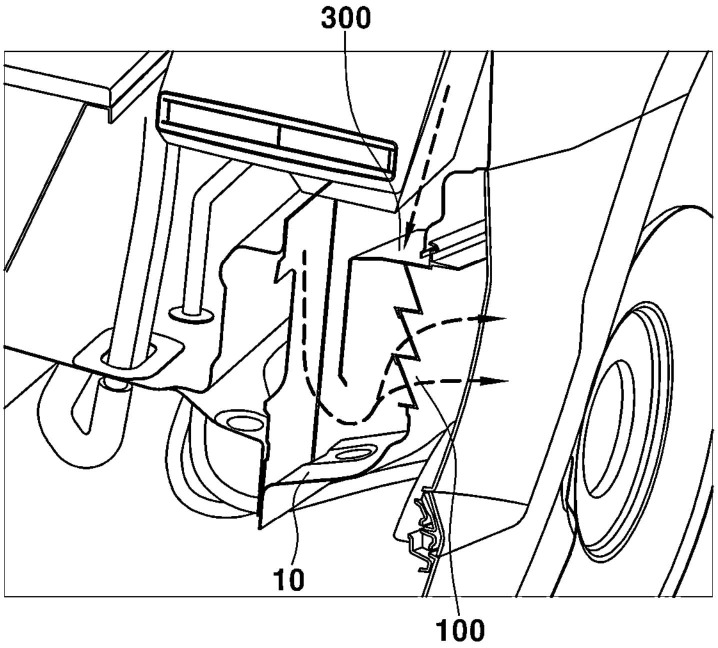
FIG. 6A (PRIOR ART)
FIGS. 6A and 6B are views showing a discharge path and noise inflow blocking, respectively, by a conventional air extractor grille duct.
Figure 6B:
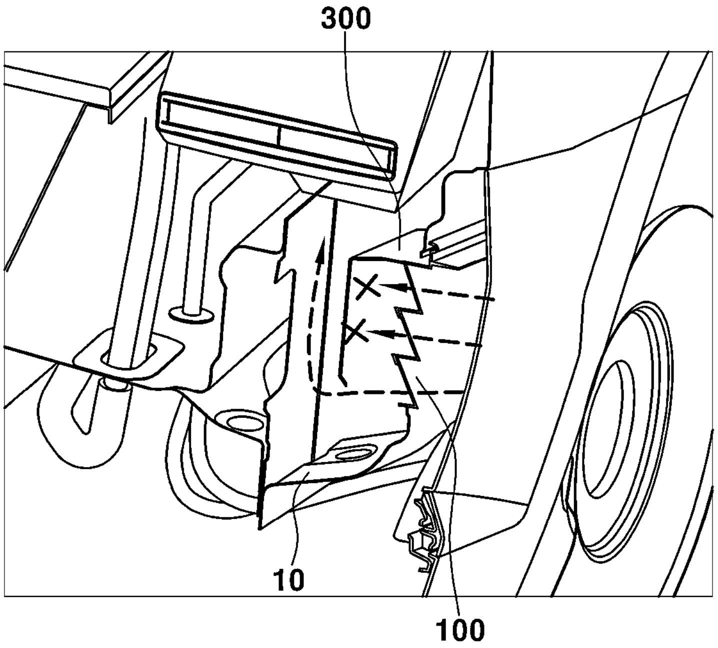
FIG. 6B (PRIOR ART)

In addition, FIG. 4 is a view showing a discharge path in an air extractor grille duct according to an embodiment of the present disclosure. FIG. 5 is a view showing noise inflow blocked by an air extractor grille duct according to an embodiment of the present disclosure. FIGS. 6A and 6B are views showing a discharge path and noise inflow blocking, respectively, by a conventional air extractor grille duct.

As shown in FIG. 1, the air extractor grille duct according to the present disclosure includes an air extractor grille 100, a duct housing 200, and a sound-absorbing cover 300.

Typically, the air extractor grille 100, although not shown in the drawing, serves as a ventilation port that discharges the interior air of the vehicle to the outside (e.g., exterior) through a rear corner of the vehicle. In other words, the air extractor grille 100 selectively discharges the interior air to the outside from a blocked state, allows ventilation to be smoothly accomplished, and prevents inflow of contaminants while driving.

In other words, as shown in FIG. 2, the air extractor grille 100 is provided with a valve or damper, which may be in the form of a plurality of flap members 110 arranged continuously in a vertical direction. The flap members 110 may be maintained in a blocked state by their own weight in order to prevent contaminants from entering the duct. However, when a pressure difference between the interior of the vehicle and the outdoor occurs, the air extractor grille 100 allows the flap members 110 to be selectively opened by the pressure difference, thereby serving as a ventilator through the discharge of the interior air.

In addition, the duct housing 200 is connected to the rear of the air extractor grille 100 and provides an exhaust path P for the interior air to flow (see FIG. 4).

Such a duct housing 200 is mounted on a lower part of a side outer panel 10 of a vehicle and is provided to be exposed to the outside together with the air extractor grille 100.

A conventional air extractor grille 100 is mounted between an upper part of the side outer panel 10 and a side or rear of a parting portion of a rear bumper (see FIGS. 6A and 6B). In order to differentiate an exterior design of a vehicle, there is a tendency to position a rear combination lamp lower than the conventional placement or to enlarge the size of the rear combination lamp. Therefore, in response, the positioning of the parting portion of the rear bumper may also be lowered.

In this case, the mounting position of the air extractor grille 100, which is mounted between the upper part of the side outer panel 10 and the side or rear of the parting portion of the rear bumper, also has no choice but to move downward. As a result, the size of the rear bumper needs to be increased to secure the mounting position of the extractor grille 100. Additionally, when the size of the rear bumper is increased, the luggage space (e.g., trunk space) is inevitably reduced.

Therefore, the duct housing 200 is mounted on a lower part of the side outer panel 10 to expose the air extractor grille 100 to the outside. Therefore, the ventilation performance may be effectively improved compared to the conventional method regardless of whether the rear combination lamp is positioned downward or if the size of the rear combination lamp is expanded.

Along with this, the duct housing 200 is provided with a mounting area whose shape corresponds to a shape of the side outer panel 10. The duct housing is positioned in contact with the side outer panel 10 through this mounting area.

In other words, the duct housing 200 is mounted on the lower part of the side outer panel 10. The duct housing 200 includes a mounting area configured to have a shape different from the shape of the side connected to the air extractor grille 100, and thus a length thereof may be optionally modified.

Where the mounting area is positioned in contact with the side outer panel 10, the duct housing 200 is provided with a fastening member 210 that penetrates through and fastens to both the mounting area and the side outer panel 10 (see FIG. 1). Accordingly, through fastening of the fastening member 210, the duct housing 200 including the air extractor grille 100 may be stably mounted on the lower part of the side outer panel 10.

The fastening member 210 includes a fastening structure of bolts and nuts, but this corresponds only to one embodiment and is not limited thereto. Therefore, the application of other fastening structures to achieve the same purpose may be possible.

The sound-absorbing cover 300 is connected to the duct housing 200, includes an inclined surface, and is configured to guide discharged interior air to flow along the inclined surface toward the discharge path P.

To this end, the sound-absorbing cover 300 includes a main body 310 and a plurality of mounting members 320.

The main body 310 is mounted (see FIG. 1) on the upper part of the side outer panel 10 to face the duct housing 200 and is provided in a predetermined size. More specifically, the main body 310 is provided with a size configured to shield the duct housing 200, by including the inclined surface provided to slope downward with respect to a center part.

In addition, the mounting members 320 extend from a lower part of the main body 310 to provide an air flow area A therein.

In other words, the mounting members 320 extend to have a predetermined length, so the main body 310 is spaced apart from the upper part of the side outer panel 10 accordingly. An air flow area A is provided in a space between the plurality of mounting members 320.

Based on the configuration of the sound-absorbing cover 300 including the main body 310 and the mounting members 320, the blocking of interior air discharge and noise inflow is achieved and is further described in detail below.

As shown in FIG. 4, the main body 310 is mounted upright above the upper part of the side outer panel 10 by the mounting members 320 but may be mounted upright in a direction opposite to a direction in which the interior air is discharged.

In other words, as shown in FIG. 6A, conventionally, the flow of the interior air coming down by being discharged from the interior of the vehicle is blocked by the sound-absorbing cover 300 as shown in the arrow direction. As a result, the interior air bypasses along a surface of the sound-absorbing cover 300 and is discharged through the air extractor grille 100.

In such a case, by allowing the interior air to be bypassed and discharged, the ventilation performance inevitably deteriorates. Therefore, the main body 310 is erected in a direction opposite to the direction in which the interior air is discharged to allow the interior air discharged from the passenger compartment or cabin to flow down along the inclined plane, passing through the air flow area A and heading to the discharge path P. The above-described conventional problems may be effectively solved by this structure (see FIG. 4).

Likewise, since the sound-absorbing cover 300 is conventionally bent and provided to have a predetermined area, the noise introduced when the air extractor grille 100 is opened may be blocked by the sound-absorbing cover 300 and not transmitted to the cabin. However, as shown in FIG. 6B, noise that may not be blocked by the sound-absorbing cover 300 flows into the cabin unattenuated, following the direction of the depicted arrow.

In order to solve such a problem, as shown in FIG. 5, in the present disclosure, the main body 310 having a size, which may cover an entire area in a direction in which the noise is introduced, is installed. The noise may be guided to a center part of the main body 310 along the inclined plane, thereby allowing effective noise attenuation to be achieved.

Furthermore, as shown in FIG. 3, a sound-absorbing pad 312 may be coupled to an inner side of the inclined surface of the main body 310. The sound-absorbing pad 312 may be mounted to the main body 310 according to the material characteristics thereof, whereby the noise trapped inside may be attenuated more effectively.

The present disclosure has an effect of improving ventilation performance compared to related art. This is achieved by installing an air extractor grille, which allows the vehicle's interior air to be discharged by allowing the valve or damper, such as the flap members, to open due to the pressure difference between the interior and exterior of the vehicle. The air extractor grille is located at the bottom of the side outer panel along with the duct and is exposed to the exterior.

In addition, the present disclosure has an effect of facilitating the exhaustion of interior air and reducing the inflow of noise into the cabin through the air extractor grille by allowing an air flow hole to be provided in the duct by mounting the sound-absorbing cover having an inclined surface to the duct.

The present disclosure has been described above with reference to the embodiment(s) shown in the drawings. However, the embodiments are only examples and those having ordinary skill in the art should appreciate that various modifications may be made from the embodiment(s) and that all or part of the embodiment(s) may be configured in selective combinations. Therefore, the true technical scope of protection of the present disclosure should be defined by the technical spirit of the appended claims.

What is claimed is:

1. An air extractor grille duct, the grille duct comprising:

an air extractor grille configured to be selectively opened due to a pressure difference between an interior and an exterior of a vehicle so that interior air of the vehicle is discharged;

a duct housing connected to the air extractor grille and configured to provide a discharge path for the interior air; and a sound-absorbing cover connected to the duct housing, provided with an inclined surface, and configured to guide discharged interior air to flow along the inclined surface toward the discharge path, wherein the sound-absorbing cover includes a main body mounted on an upper part of a side outer panel to face the duct housing and including the inclined surface provided to slope downward with respect to a center part, and mounting members extending from a lower part of the main body and allowing an air flow area to be provided therein.

2. The grille duct of claim 1, wherein the air extractor grille is provided with a plurality of flap members arranged in a vertical direction and configured to allow the plurality of flap members to be maintained in a blocking state by their own weight and to be opened as a pressure difference occurs.

3. The grille duct of claim 1, wherein the duct housing is mounted on a lower part of a side outer panel and is provided to be exposed to the exterior together with the air extractor grille.

4. The grille duct of claim 3, wherein the duct housing is provided with a mounting area with a shape that corresponds to a shape of the side outer panel and is positioned in contact with the side outer panel through the mounting area.

5. The grille duct of claim 4, wherein, in a state where the mounting area is positioned in contact with the side outer panel, the duct housing is provided with a fastening member that penetrates through and fastens to both the mounting area and the side outer panel.

6. The grille duct of claim 1, wherein the main body is mounted upright above the upper part of the side outer panel by the mounting members and in a direction opposite to a direction in which the interior air is discharged.

7. The grille duct of claim 1, wherein the main body is provided with a sound-absorbing pad coupled to an inside of the inclined surface and wherein the sound-absorbing pad is configured to block a noise introduced through an opening of the air extractor grille from entering a cabin of the vehicle.

* * * * *